(12) United States Patent
Pondelick

(10) Patent No.: US 7,533,426 B2
(45) Date of Patent: May 19, 2009

(54) GRAY WATER INTERFACE VALVE SYSTEMS AND METHODS

(75) Inventor: Mark Pondelick, Rockton, IL (US)

(73) Assignee: MAG Aerospace Industries, Inc., Carson, CA (US)

( * ) Notice: Subject to any disclaimer, the term of this patent is extended or adjusted under 35 U.S.C. 154(b) by 142 days.

(21) Appl. No.: 11/473,895

(22) Filed: Jun. 22, 2006

(65) Prior Publication Data

US 2007/0151020 A1    Jul. 5, 2007

Related U.S. Application Data

(60) Provisional application No. 60/693,726, filed on Jun. 24, 2005.

(51) Int. Cl.
*E03C 1/24* (2006.01)

(52) U.S. Cl. .................... 4/651; 4/638; 4/650

(58) Field of Classification Search ........... 4/572.1, 4/669, 321, 431, 629, 435, 662, 471, 665, 4/650, 651, 638; 210/748, 86, 808, 411; 241/260; 137/347

See application file for complete search history.

(56) References Cited

U.S. PATENT DOCUMENTS

| | | | |
|---|---|---|---|
| 3,590,397 | A | 7/1971 | Akamatsu et al. |
| 3,996,628 | A | 12/1976 | Mollerstedt |
| 4,232,409 | A | 11/1980 | Van Pham |
| 4,275,470 | A | 6/1981 | Badger et al. |
| 4,276,663 | A | 7/1981 | Gensurowsky |
| 4,306,321 | A | 12/1981 | Norlin |
| 4,376,314 | A | 3/1983 | Iwans |
| 4,439,874 | A | 4/1984 | Schrock |
| 4,510,629 | A | 4/1985 | Jovy et al. |
| RE32,750 | E | 9/1988 | Grills et al. |
| 4,882,792 | A | 11/1989 | Vincent |
| 4,905,325 | A | 3/1990 | Colditz |
| 4,928,326 | A | 5/1990 | Olin et al. |
| 5,007,117 | A | 4/1991 | Oldfelt et al. |
| 5,035,011 | A * | 7/1991 | Rozenblatt et al. ............. 4/665 |
| 5,035,140 | A | 7/1991 | Daniels et al. |

(Continued)

FOREIGN PATENT DOCUMENTS

EP    0363012    4/1990

*Primary Examiner*—John Rivell
*Assistant Examiner*—Macade Brown
(74) *Attorney, Agent, or Firm*—Dean W. Russell; Kristin M. Crall; Kilpatrick Stockton LLP

(57) ABSTRACT

Embodiments of the present invention provide systems and methods for a gray water interface valve for use with a vacuum source and a collection tank. The systems and methods comprise a basin for collecting gray water, the basin having an outlet; a reservoir in fluid communication with the outlet, the reservoir adapted to house gray water; a vent line associated with the reservoir; a pressure switch associated with the reservoir, the pressure switch adapted to signal when the reservoir is full; a controller associated with the pressure switch, the controller adapted to begin a discharge cycle by checking and switching on the vacuum source if necessary; a solenoid valve activated by the controller in order to control the flow of vacuum through the system; and a drain valve adapted to open via vacuum pressure and evacuate gray water from the reservoir, wherein the drain valve is adapted to close before all of the gray water from the reservoir is emptied to reduce noise.

11 Claims, 2 Drawing Sheets

U.S. PATENT DOCUMENTS

| | | |
|---|---|---|
| 5,067,181 A | 11/1991 | Hafner et al. |
| 5,123,124 A | 6/1992 | Brower |
| 5,232,010 A | 8/1993 | Rozenblatt et al. |
| 5,282,281 A | 2/1994 | Clear et al. |
| 5,421,040 A | 6/1995 | Oldfelt |
| 5,426,794 A | 6/1995 | Hennessy |
| 5,454,936 A * | 10/1995 | Ask et al. .................. 210/86 |
| 5,515,555 A | 5/1996 | Wormcke |
| 5,524,655 A | 6/1996 | Powers et al. |
| 5,692,250 A | 12/1997 | Oldfelt et al. |
| 5,832,546 A | 11/1998 | Inch |
| 6,006,373 A | 12/1999 | Hoang |
| 6,085,366 A | 7/2000 | Pondelick et al. |
| 6,143,185 A | 11/2000 | Tracy et al. |
| 6,223,361 B1 | 5/2001 | Rozenblatt |
| 6,226,807 B1 | 5/2001 | Rozenblatt et al. |
| 6,330,725 B1 | 12/2001 | Karlsson et al. |
| 6,385,789 B1 | 5/2002 | Pondelick et al. |
| 6,401,270 B1 | 6/2002 | Moore |
| 6,434,759 B1 | 8/2002 | Pondelick et al. |
| 6,510,564 B1 | 1/2003 | Karlsson et al. |
| 6,640,701 B2 | 11/2003 | Hoffjann et al. |
| 6,702,942 B1 | 3/2004 | Nield |
| 6,977,005 B2 | 12/2005 | Erdmann et al. |
| 2002/0112281 A1 | 8/2002 | Erdmann et al. |
| 2002/0133869 A1 | 9/2002 | Pondelick et al. |
| 2002/0144337 A1 | 10/2002 | Go |
| 2006/0288472 A1 | 12/2006 | Pondelick |
| 2007/0102370 A1 * | 5/2007 | Hoffjann et al. ............ 210/784 |

* cited by examiner

GRAY WATER INTERFACE VALVE SYSTEMS AND METHODS

This application claims the benefit of U.S. Provisional Application Ser. No. 60/693,726, filed Jun. 24, 2005 titled "Gray Water Interface Valve," the entire contents of which are incorporated by reference.

FIELD OF THE INVENTION

The present invention relates to a system for collecting and storing waste water, particularly gray water that is generated on passenger transport vehicles.

BACKGROUND

Food service and other passenger services in passenger transport vehicles (such as aircraft, ships, buses, trains, and any other passenger transport vehicles), causes waste water and material to accrue. This waste water often includes leftover portions of beverages, water from the lavatory, and so forth. A specific form of waste water is gray water. Gray water is "used" water that drains from drinking water systems, from wash basins during hand washing, material poured down a galley sink, or any other instance in which water is soiled or loaded with waste (e.g., soaps, detergents, soils from hand washing). Gray water typically does not include contaminants such as septic wastes (water containing septic waste is generally referred to as "black water").

Most large passenger transport vehicles are equipped with a gray water system and a waste water system for collecting, storing and ultimately disposing of gray water and other waste water, such as black water. For example, aircrafts typically have a vacuum disposal system that applies a vacuum to suck waste water from toilets and/or sinks into an on-board waste water storage tank. The suction is generated either by the pressure differential between the pressurized cabin and the reduced pressure outside of an aircraft at high flight altitudes or by a vacuum generator at ground level or at low flight altitudes.

Currently, according to current health standard guidelines for airlines, black water is vacuumed away to a septic tank on the aircraft, and gray water is vacuumed away to be discharged in a separate tank or outside the aircraft. Public health rules do not allow gray water and black water to be disposed of in the same tank. This is primarily because, if a back-up were to occur, sewage would be expelled from galley and lavatory sinks, as well as toilets, which could create a myriad of health problems. Accordingly, separate disposal and discharge of gray water can create challenges. First, if gray water is disposed outside the aircraft, it needs to be heated because aircraft travel at such high altitudes where the air is so cold, that discharging gray water at room temperature would cause it to freeze immediately. Accordingly, aircraft are equipped with drain masts that heat gray water prior to its discharge. This uses extra energy, adds to maintenance issues (e.g., clogs often form and need to be removed), and can cause safety problems on the ground if the drain masts are not turned off (e.g., extremely hot liquids can be discharged from a plane on the ground and scald a worker standing below the plane). Second, disposing gray water outside the aircraft often causes the material to "paint" the side of the plane (consider wine and orange juice being discharged outside a plane and leaving a long, unsightly streak). This adds to maintenance and cleaning costs and could tarnish an airline's reputation for being professional and well-maintained. Third, some airports will not allow gray water to be deposited on their runways, causing airlines to find alternate solutions to outside disposal. Fourth, depositing wastes outside an aircraft that are contaminated with detergent and other soils can be an environmental hazard. Accordingly, alternate solutions for disposing of gray water are needed. Providing a separate tank for gray water is not an economical solution.

Currently, most commercial aircraft are equipped with galley and lavatory sinks. These sinks are typically intended for the disposal of fluid waste, such as excess beverages, water from melting ice, soiled water from hand washing, and so forth. They are connected to small diameter drain lines (which can easily back up if clogged) and terminate at the aircraft drain mast for exhaustion to the atmosphere. In addition to the disposal problems described above, these sink systems are typically unable dispose of a slurry of liquid and solid waste material, which commonly accumulate (e.g., coffee grounds or other solid/liquid mixed waste products).

One response to the disposal challenges presented by gray water has been to provide a food waste disposal system that includes a galley sink system based on existing aircraft vacuum toilet designs. One problem with these designs is that they can be quite loud. A flushing sound is created when the flush valve opens; the differential pressure is what forcefully draws the waste down the drain. If such systems are incorporated into a galley sink (which is not necessarily behind a closed door, but in a passageway near aisles where passengers sit), a lid can be provided, but that can be inconvenient and not entirely effective for noise reduction.

Accordingly, it is desirable to provide a galley waste disposal system, and particularly, a system and method for removal of gray water from passenger transport vehicles such as aircraft, that can remove liquid waste (as well as liquid waste that may be partially mixed with solid waste), and that can conduct this removal in a discrete, relatively quiet, and environmentally friendly manner. It is also desirable to provide a system and method for storing gray water in the black water (or septic) tanks that are on-board an aircraft that includes a no-fail valve that will prevent any back up of the tank into sinks or basins that receive gray water.

SUMMARY

Embodiments of the present invention provide a galley waste disposal system that interfaces with a vacuum waste system. One application for various embodiments described herein is in conjunction with an aircraft vacuum waste system that collects gray (or "used") water from lavatory and galley sinks and stores it in the aircraft waste tank during flight. Embodiments of the present invention may replace the current gray water system on aircrafts (which dumps gray water overboard through drain masts on the bottom of the aircraft) and provide an "environmentally friendly" aircraft that does not discharge any waste material overboard. They also provide a safe way to combine the gray water in the black water septic tank on-board the aircraft that can address the safety and health concerns with combing gray and black water in the same collection tank.

In a specific embodiment, there are provided systems and methods for a gray water interface valve for use with a vacuum source and a collection tank. The systems and methods comprise a basin for collecting gray water, the basin having an outlet; a reservoir in fluid communication with the outlet, the reservoir adapted to house gray water; a vent line associated with the reservoir; a pressure switch associated with the reservoir, the pressure switch adapted to signal when the reservoir is full; a controller associated with the pressure switch, the controller adapted to begin a discharge cycle by checking and switching on the vacuum source if necessary; a solenoid valve activated by the controller in order to control the flow of vacuum through the system; and a drain valve adapted to open via vacuum pressure and evacuate gray water from the reservoir, wherein the drain valve is adapted to close before all of the gray water from the reservoir is emptied to reduce noise.

DETAILED DESCRIPTION OF THE DRAWINGS

Figure 1:
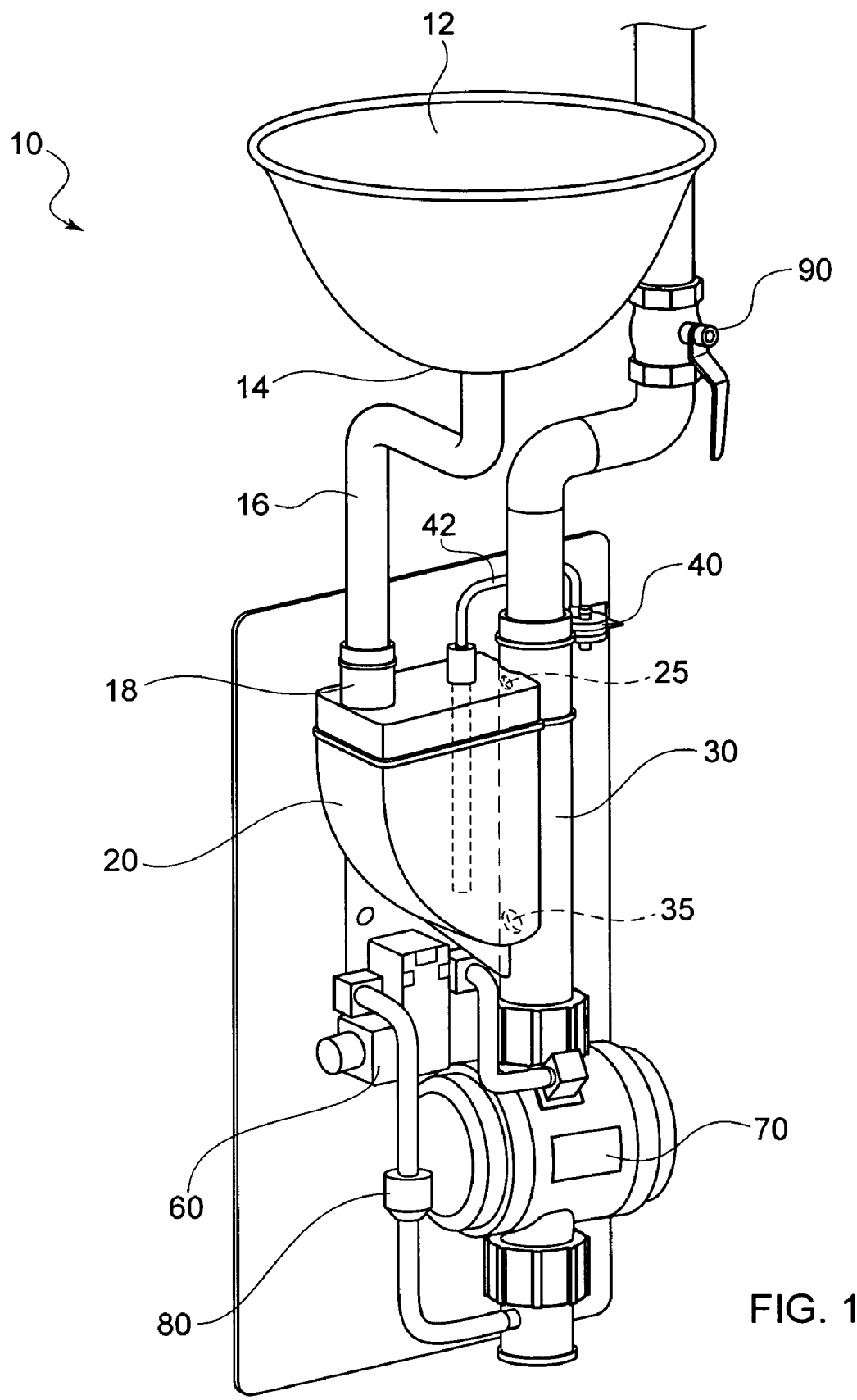
FIG. 1 shows a front view of a galley waste disposal system according to certain embodiments of the invention.
Figure 2:
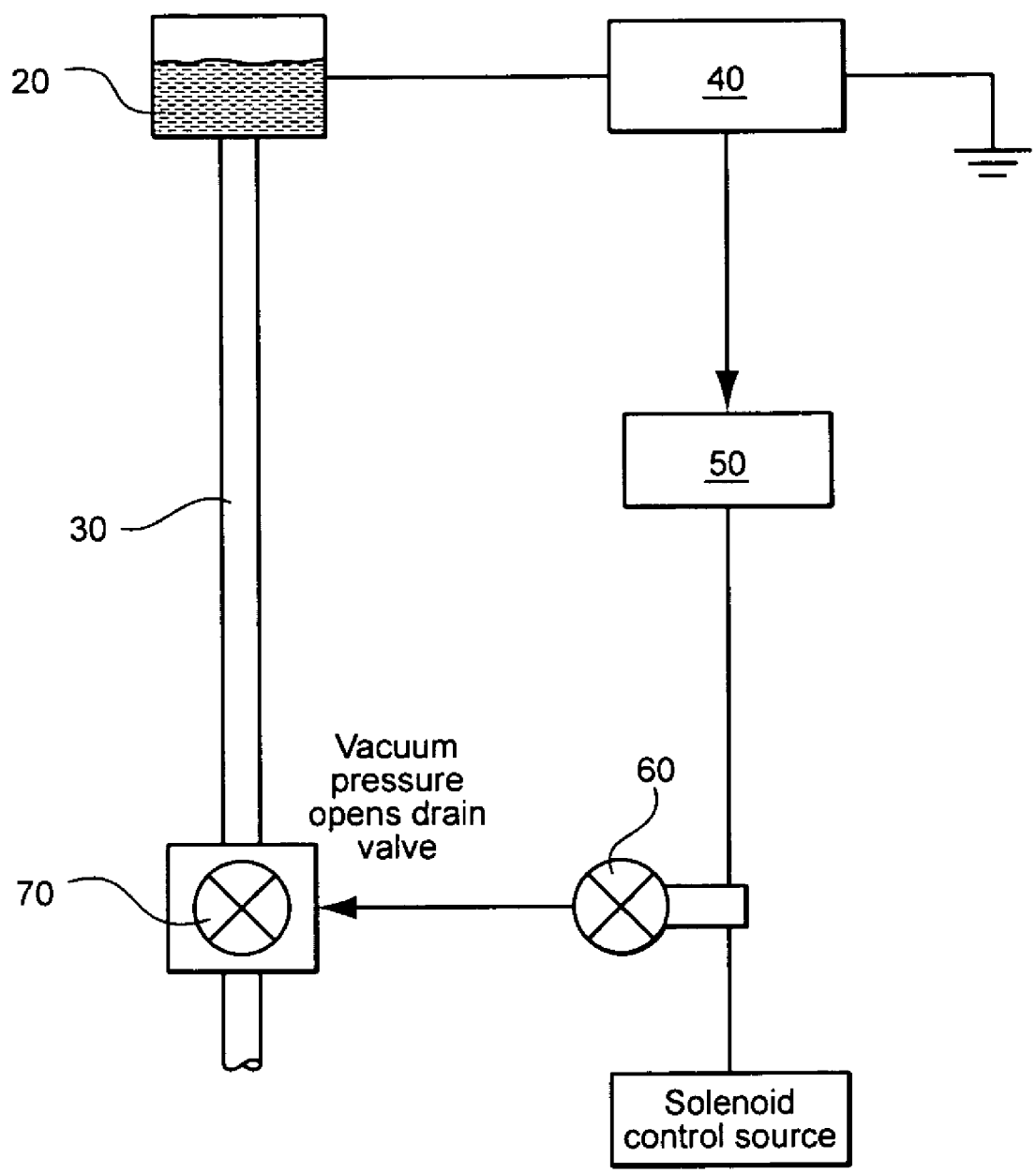
FIG. 2 shows a schematic view of the system of FIG. 1

Embodiments of the present invention provide a galley waste disposal system 10 that is particularly useful in disposing of gray water in passenger transport vehicles, such as aircraft. As will be described in more detail below, the system 10 generally includes a basin 12, a reservoir 20, a vent line 30, a pressure switch 40, a controller 50, a solenoid valve 60, a drain valve 70, and a check valve 80. The drain valve 70 controls the flow of gray water through the system 10, and its specific opening and closing action helps prevent a loud suction noise during the waste removal process, as well as provides a fail safe feature that prevents any back flow from the collection tank into the basin. The check valve 80 is also used for back flow prevention. By design, it does not allow gray water to seep back into the solenoid valve 60 which could clog it and cause it to not function upon demand properly. The system 10 is connected to a vacuum sewer line that leads to a collection tank (not shown).

As shown in FIG. 1, a basin 12 is provided that receives waste water (or gray water). It may be a sink in a lavatory, a galley, a food service area, or any other location on a passenger transport vehicle that receives waste water. Basin 12 may be mounted on or supported by a countertop. In certain embodiments, basin 12 may also be provided with an optional rinse water system that can rinse basin 12 after use. An outlet 14 at the base of basin 12 transports the used gray water through a passage 16 to the reservoir 20. The basin 12 and related plumbing are attached to and in fluid communication with the reservoir 20 at connection area 18.

Reservoir 20 is provided as a part of the system 10 to hold and store gray water for a period of time. Reservoir 20 may be any appropriate size, shape, and material. In certain embodiments, reservoir 20 can hold at least an amount of gray water that is equivalent to the water used for a short hand-washing, e.g., at least about eight ounces. However, its capacity may be much larger. The size of reservoir 20 can depend upon a myriad of factors, such as the space limitation into which system 10 must fit, the amount of volume that the vehicle can hold, and the amount of sound attenuation needed (e.g., if it is desired for reservoir to hold a large amount of water before discharge cycle to prevent the discharge sound, reservoir 20 should be sized accordingly.) Providing reservoir 20 in fluid communication with basin 12 allows it to act as a "holding tank" for gray water before the vacuum suction is applied to remove it from system 10. As will be described in more detail below, the liquid held in the reservoir helps block sound from basin during the discharge cycle.

Reservoir 20 is also associated with vent line 30. As shown in FIG. 1, reservoir 20 may be side-by-side with vent line 30 or vent line 30 may run up the middle of reservoir 20 (similar to the concept of an enclosed straw in a glass of water), which may save space. Any appropriate configuration is possible, as long as reservoir 20 and vent line 30 are in fluid communication with one another.

As water enters reservoir 20, it fills reservoir 20 and vent line 30 through a hole 35 that is at the bottom of the reservoir that connects it to the vent line 30 (described in more detail below). Reservoir may also be vented at vent 25 in order to reduce noise heard at the sink drain, as well as to eliminate bubbling water experienced at the sink drain. Vent 25 may be at an upper portion of reservoir 20 and communicates or "vents" into vent line 30. Vent 25 allows equalization between air in the reservoir 20 and air in the vent line 30. In another embodiment, vent 25 may be a separate tube that extends up or out from a top portion of reservoir. Vent may take any form, as long as it accomplishes the function of venting excess air inside the reservoir 20 to outside the reservoir 20.

It bears noting that the drain valve 70 remains closed during the water accumulation stage. When vent line 30 and reservoir 20 are at or near capacity, a pressure switch 40 is activated. The capacity (or amount of gray water) that will activate pressure switch can be set at any desired level. For example, a specific height of the water column can be programmed to trigger the pressure switch 40 to activate. Pressure switch may be connected to a tube 42 that extends inside reservoir 20. This can help pressure switch 40 in sensing the water capacity. Once the set capacity of the reservoir 20 and vent line 30 has been reached, pressure switch 40 signals to the controller 50 that the reservoir and vent line are full and that a discharge cycle should be initiated.

The switch 40 sends a signal to the controller 50 to start a cycle. The controller may be mounted underneath the basin or it may be at a remote location and electronically or wirelessly connected to switch 40. The controller 50 first checks to determine whether or not the collection tank is full. As long as the collection tank is not already full, the controller 50 then determines whether there is sufficient vacuum in the system. (For example, if the aircraft is on the ground or at a low altitude, there may not be a sufficient pressure differential to achieve vacuum suction, and a separate vacuum source is activated.) If there is not sufficient vacuum, the controller commands the vacuum source (or generator) to turn on. When sufficient vacuum is available, a signal is sent to the solenoid valve 50 to open and to shuttle vacuum to the drain valve 70. (The solenoid is controlled by a solenoid valve control source, which may be a voltage source (e.g., 28V), but it should be understood that the control may be accomplished via pneumatic pressure, hydraulic pressure, solar power, or any other appropriate control source.)

Up until now, the drain valve has been in its closed position. The drain valve 70 opens only for a few seconds (or less) to accomplish the discharge function and then immediately closes, as described below. This is important to note because it is this feature and action of the drain valve 70 that allows gray water to be combined with black water in the septic tank safely. If there was a back-up in the septic collection tank, it could not extend past the drain valve, and thus, would not cause a back up in the galley and lavatory sinks. The drain valve 70 provides a fail safe system to prevent back flow from the septic collection tank.

When the drain valve 70 is opened via vacuum, gray water is evacuated from the reservoir 20 and the vent line 30. Again, the vacuum action caused by the system sucks the gray water away from the reservoir 20, vent line 30, and drain valve 70. The drain valve 70 cannot open without that suction force behind it. As the gray water is being removed, a small amount of air is also drawn in and allowed to flow in through the vent line 30. This helps reduce noise by preventing air from being drawn in through the basin (it is understood, of course, that some of the air may be drawn in through the basin, it is just preferable that most of the air be drawn in through the vent line 30), as well as aids in the transport of the gray water to the waste collection tanks.

As described earlier, the gray water is emptied into the reservoir 20 but immediately goes into the vent line 30 through a hole 35 that is located at the bottom of the reservoir 20 that connects the reservoir 20 to the vent line 30. This hole 35 essentially restricts the flow of gray water from the reservoir 20 into the vent line 30. Hole 35 may be any appropriate size, although it is typically less than the diameter of the vent line 30 (e.g., which is typically two inches, although it may be greater or lesser, depending upon design factors), and typically greater than about ¼ inch, otherwise, flow may be too restricted. In certain embodiments, hole 35 is between about ¼ inch and about 2 inches, and even more specifically, between about ½ inch and ¾ inch in diameter. In one specific embodiment, hole 35 is about ⅝ inch. Providing hole 35 allows the vent line 30 to empty more quickly than the reservoir 20, aiding in noise reduction during the discharge cycle. This noise reduction occurs by having the vent line 30 empty out first and timing the drain valve 70 to close just prior to the reservoir 20 emptying out completely. This also reduces the amount of air that is drawn through the basin drain 14. By not allowing the reservoir 20 to empty fully, the seal that is created by the gray water being above the hole is never broken, avoiding an in-rush of air that would be drawn through the basin drain 14 and the associated noise that would be generated. In some embodiments, the sound of the discharge cycle can be as low as about 70 dBa.

Once the cycle is completed, if the vacuum generator was activated, it is now commanded off. The water remaining in the reservoir stabilizes, and the system 10 is now ready to start collecting gray water for the next cycle.

If the gray water continues to enter the system 10 at a steady stream, the system may be designed to keep the drain valve 70 open until the pressure switch 40 resets. Additionally, for storage purposes, an automatic purge cycle may be activated that removes all the gray water from the reservoir 20 to prevent freezing and odors from occurring during storage periods.

An additional feature that can be added to the system 10 is known as the "clog clearing" feature. Essentially, if the system 10 was to ever get clogged and the purge cycle fails to remove the clog, the "clog clearing" feature could be used to remove the clog. As already stated, the use of the purge cycle would be the first attempt to remove a clog, which utilizes the available vacuum whether it is from the vacuum generator or the differential pressure created between the cabin and the outside. The available vacuum, however, is being utilized through the vent line 30 and the reservoir 20 at the same time, thus reducing the vacuum affect. If the vacuum is not enough to remove the clog, then this issue could be addressed by adding a manual valve 90 (one example of a clog clearing feature or valve) in the vent line 30. If a clog becomes present in the reservoir 20, the manual valve 90 can be closed to draw the system's full vacuum through the basin drain 14 and reservoir 20 in order to eliminate it. Valve 90 may be anywhere on vent line 30, although if it is provided at basin level, it can be easier to access. However, it should be understood that valve 90 may be close to hole 35 between reservoir and vent line 30 or at the upper part of the vent line.

Changes and modifications, additions and deletions may be made to the structures and methods recited above and shown in the drawings without departing from the scope or spirit of the invention and the following claims.

What is claimed is:

1. A gray water interface valve system for use with a vacuum source and a collection tank, comprising:
   (a) a basin for collecting gray water, the basin having an outlet;
   (b) a reservoir in fluid communication with the outlet, the reservoir adapted to house gray water;
   (c) a vent line associated with the reservoir;
   the reservoir and the vent line positioned side-by-side and in fluid communication via a reservoir hole located on a lower side portion of the reservoir, such that gray water entering the reservoir flows into the vent line through the reservoir hole and fills the reservoir and vent line simultaneously;
   (d) a pressure switch associated with the reservoir, the pressure switch adapted to signal when the reservoir is full;
   (e) a controller associated with the pressure switch, the controller adapted to begin a discharge cycle by checking and switching on the vacuum source if necessary;
   (f) a solenoid valve activated by the controller in order to control the flow of vacuum through the system; and
   (g) a drain valve adapted to open via vacuum pressure and evacuate gray water from the vent line and the reservoir, the vent line emptying more quickly than the reservoir due to the reservoir hole, wherein the drain valve is adapted to close before all of the gray water from the reservoir is emptied.

2. The system of claim 1, further comprising a check valve adapted to prevent gray water from seeping back into the solenoid valve.

3. The system of claim 1, wherein the hole between the reservoir and the vent line restricts air flow from the reservoir during a discharge cycle.

4. The system of claim 1, further comprising a vent from the reservoir.

5. The system of claim 1, wherein the reservoir can hold at least about eight ounces of gray water.

6. The system of claim 1, installed into an aircraft galley.

7. The system of claim 1, installed into an aircraft lavatory.

8. A method for evacuating gray water from a basin, comprising:
   (a) providing a basin for collecting gray water, the basin being in fluid communication with a reservoir, the reservoir being in fluid communication with a vent line; the reservoir and the vent line positioned side-by-side and in fluid communication via a reservoir hole located on a lower side portion of the reservoir;
   (b) filling the basin with gray water so that the gray water extends into the reservoir and the vent line; such that gray water entering the reservoir flows into the vent line through the reservoir hole and fills the reservoir and vent line simultaneously;
   (c) causing a pressure switch to signal when the reservoir is full;
   (d) causing a controller to begin a discharge cycle by switching on a vacuum source if necessary;
   (e) opening a solenoid valve to cause vacuum to flow through the system;
   (f) opening a drain valve to evacuate gray water from the vent line and into a collection tank; and
   (g) closing the drain valve before all of the gray water is emptied from the reservoir.

9. The method of claim 5, wherein the controller begins a discharge cycle by:
   (i) determining whether the tank is full;
   (ii) if the tank is not full, determining whether there is sufficient vacuum in the system;
   (iii) if there is not sufficient vacuum, activating the vacuum source;
   (iv) when sufficient vacuum is available, sending a signal to the solenoid valve to open and shuttle vacuum to the drain valve.

10. The method of claim 5, wherein the closing of the drain valve before gray water from the reservoir is emptied is intended to prevent air from being drawn into the system through the basin during a discharge cycle, thus reducing noise level.

11. The method of claim 5, wherein gray water enters the gray water apparatus in a continuous manner, and the drain valve remains open until the pressure switch resets.

* * * * *